(12) United States Patent
Mitchell et al.

(10) Patent No.: US 10,239,294 B2
(45) Date of Patent: Mar. 26, 2019

(54) HEAT SHRINK LABEL FILM, A HEAT SHRINK LABEL AND A METHOD FOR LABELLING OF AN ITEM

(71) Applicant: UPM RAFLATAC OY, Tampere (FI)

(72) Inventors: Noel Mitchell, Wuppertal (DE); Matti Manner, Tampere (FI)

(73) Assignee: UPM RAFLATAC OY, Tampere (FI)

( * ) Notice: Subject to any disclaimer, the term of this patent is extended or adjusted under 35 U.S.C. 154(b) by 46 days.

(21) Appl. No.: 14/903,151

(22) PCT Filed: Jul. 12, 2013

(86) PCT No.: PCT/FI2013/050755
§ 371 (c)(1),
(2) Date: Jan. 6, 2016

(87) PCT Pub. No.: WO2015/004310
PCT Pub. Date: Jan. 15, 2015

(65) Prior Publication Data
US 2016/0136934 A1    May 19, 2016

(51) Int. Cl.
*G09F 3/00*    (2006.01)
*G09F 3/02*    (2006.01)
(Continued)

(52) U.S. Cl.
CPC .............. *B32B 27/32* (2013.01); *B32B 27/08* (2013.01); *B32B 27/325* (2013.01); *B32B 37/06* (2013.01);
(Continued)

(58) Field of Classification Search
None
See application file for complete search history.

(56) References Cited

U.S. PATENT DOCUMENTS

| 4,034,131 A | 7/1977 | Rhoads |
| 4,352,849 A | 10/1982 | Mueller |

(Continued)

FOREIGN PATENT DOCUMENTS

| CA | 2178459 A1 | 12/1996 |
| EP | 0763422 A1 | 3/1997 |

(Continued)

OTHER PUBLICATIONS

Database WPI Week 200435 Thomson Scientific, London, GB: AN 2004-367010 XP002767255, & JP 2004 066533 A (Mitsubishi Plastics IND Ltd) Mar. 4, 2004 *abstract*.

(Continued)

*Primary Examiner* — Laura C Powers
(74) *Attorney, Agent, or Firm* — Cantor Colburn LLP

(57) ABSTRACT

The invention relates to a heat shrink label (4) and a multilayer face film of the label (4). According to an embodiment multilayer face film is oriented in one direction. The multilayer face film includes at least one layer comprising first cyclic olefin copolymer and second cyclic olefin copolymer and the first cyclic olefin copolymer is different from the second cyclic olefin copolymer. A glass transition temperature of the first cyclic olefin copolymer and the second cyclic olefin copolymer is between 50 and 90° C. Further the application concerns a combination of a label (4) and an item (8), a method for providing a heat shrink label (4), a method for labelling an item (8) and a method for separating a label (4) from an item (8) labelled.

30 Claims, 5 Drawing Sheets

(51) Int. Cl.

| | |
|---|---|
| *G09F 3/06* | (2006.01) |
| *B32B 27/08* | (2006.01) |
| *B32B 27/32* | (2006.01) |
| *B32B 37/06* | (2006.01) |
| *B32B 38/10* | (2006.01) |
| *B32B 43/00* | (2006.01) |
| *C08L 45/00* | (2006.01) |

(52) U.S. Cl.
CPC ............ *B32B 38/10* (2013.01); *B32B 43/006* (2013.01); *C08L 45/00* (2013.01); *G09F 3/0291* (2013.01); *G09F 3/06* (2013.01); *B32B 2270/00* (2013.01); *B32B 2307/516* (2013.01); *B32B 2307/736* (2013.01); *B32B 2439/70* (2013.01); *B32B 2519/00* (2013.01); *G09F 2003/0251* (2013.01); *G09F 2003/0257* (2013.01); *Y02P 20/582* (2015.11)

(56) References Cited

U.S. PATENT DOCUMENTS

| | | | |
|---|---|---|---|
| 4,762,748 A | 8/1988 | Oberle | |
| 5,631,078 A | 5/1997 | Ellery et al. | |
| 5,691,043 A | 11/1997 | Keller et al. | |
| 5,846,620 A | 12/1998 | Compton | |
| 5,888,660 A | 3/1999 | Landoni et al. | |
| 2002/0068137 A1* | 6/2002 | Paleari | B29C 66/7371 428/34.9 |
| 2002/0192412 A1 | 12/2002 | Satani et al. | |
| 2004/0126518 A1* | 7/2004 | Mendes | B32B 27/32 428/34.8 |
| 2005/0004390 A1* | 1/2005 | Nakao | C07C 51/09 560/89 |
| 2007/0098933 A1* | 5/2007 | Opuszko | B32B 27/08 428/35.2 |
| 2009/0068486 A1 | 3/2009 | Blackwell et al. | |
| 2011/0065867 A1 | 3/2011 | Keung et al. | |
| 2016/0136935 A1 | 5/2016 | Mitchell et al. | |
| 2016/0152010 A1 | 6/2016 | Mitchell et al. | |
| 2016/0193815 A1 | 7/2016 | Mitchell et al. | |
| 2017/0174379 A1 | 6/2017 | Mitchell et al. | |

FOREIGN PATENT DOCUMENTS

| | | |
|---|---|---|
| EP | 0844077 A2 | 5/1998 |
| EP | 1300238 A2 | 4/2003 |
| EP | 1632343 A1 | 6/2004 |
| JP | 60187543 | 9/1985 |
| JP | 03013338 | 1/1991 |
| JP | 2001215880 A | 8/2001 |
| JP | 2004066533 A | 3/2004 |
| JP | 2004170468 A | 6/2004 |
| JP | 2005254458 A | 9/2005 |
| JP | 2006116874 A | 5/2006 |
| JP | 2009001007 A | 1/2009 |
| JP | 2010030287 A | 2/2010 |
| JP | 2012111068 A | 6/2012 |
| WO | 2007050605 A2 | 5/2007 |
| WO | 2007050605 A3 | 5/2007 |
| WO | 2007127233 A2 | 11/2007 |
| WO | 2010047906 A1 | 4/2010 |
| WO | 2010117771 A1 | 10/2010 |
| WO | 2015004311 A1 | 1/2015 |
| WO | 2015004314 A1 | 1/2015 |
| WO | 2015004315 A1 | 1/2015 |
| WO | 2015004316 A1 | 1/2015 |
| WO | 2015118212 A1 | 8/2015 |

OTHER PUBLICATIONS

Database WPI, Week 200569, Thomson Scientific, London, GB; AN 2005-668634 XP002767254, & JP 2005 254458 A (Mitsubishi Plastics IND Ltd) Sep. 22, 2005 *abstract*.
European Search Report for European Application No. 13889281.5; dated Mar. 3, 2017; 11 pages.
European Search Report for European Application No. 16205196.5; dated May 26, 2017; 7 pages.
International Search Report dated Mar. 13, 2014; International Application No. PCT/FI2013/050761: International Filing Date Jul. 12, 2013 (6 pages).
International Search Report dated Apr. 24, 2014; International Application No. PCT/FI2013/050759; International Filing Date Jul. 12, 2013 (3 pages).
International Search Report dated Apr. 24, 2014; International Application No. PCT/FI2013/050760; Application Filing Date Jul. 12, 2013 (3 pages).
Italian Patent Application No. IT 1999-MI1935; Publication Date Mar. 19, 2001 (abstract only 2 pages).
Written Opinion dated Mar. 13, 2014; International Application No. PCT/FI2013/050761; International Filing Date Jul. 12, 2014 (9 pages).
Written Opinion dated Apr. 24, 2014; International Application No. PCT/FI2013/050759; International Filing Date Jul. 12, 2013 (6 pages).
Written Opinion dated Apr. 24, 2014; International Application No. PCT/FI2013/050760; International Filing Date Jul. 12, 2013 (6 pages).
Arkema, Lotryl 17BA04: Ethylene—Butyl Acrylate copolymer, Jun. 2013, Arkema; Downloaded Jun. 23, 2016; http://www.lotryl.com/export/sites/lotryl/.content/medias/downloads/literature/tds_lotryl_17ba04_2010.pdf; 2 pages.
Non Final Office Action for U.S. Appl. No. 14/902,408, filed Dec. 31, 2015; dated Jun. 21, 2016; 23 pages.
International Search Report dated Mar. 14, 2014; International Application No. PCT/FI2013/050756; International Filing Date Jul. 12, 2013 (5 pages).
International Search Report dated Mar. 20, 2014; International Application No. PCT/FI2013/050755; International Filing Date Jul. 12, 2013 (3 pages).
Written Opinion dated Mar. 14, 2014; International Application No. PCT/FI2013/050756; International Filing Date Jul. 12, 2013 (8 pages).
Written Opinion dated Mar. 20, 2014; International Application No. PCT/FI2013/050755; International Filing Date Jul. 12, 2013 (4 pages).

* cited by examiner

HEAT SHRINK LABEL FILM, A HEAT SHRINK LABEL AND A METHOD FOR LABELLING OF AN ITEM

FIELD OF THE INVENTION

The application relates to a film of a label. Especially to a heat shrink film for labelling applications. Further the application concerns a method for labelling of an item.

BACKGROUND OF THE INVENTION

It is general practice to apply a label to a surface of an item to provide decoration, and/or to display information about the product being sold, such as the content of the item, a trade name or logo. In addition to pressure-sensitive, wet glue and wrap around labels other labelling technologies are available, for example shrink sleeves. Shrink sleeves may be provided by forming a tube of plastic film, which may be dropped over an item to be labelled and subsequently fed the item through a shrink-tunnel at elevated temperature causing the film to shrink and fit the shape of the item.

SUMMARY OF THE INVENTION

It is an object of this application to provide a heat shrink plastic film and a heat shrink label comprising said heat shrinkable plastic film. Another object is to provide a combination of a heat shrink label and an item. Still another object is to provide a method for applying a heat shrink label to an item and a use of a heat shrink plastic film for labelling.

A heat shrink label according to an embodiment comprises a multilayer face film oriented in one direction. The multilayer face film includes at least one layer (first layer) comprising first cyclic olefin copolymer and second cyclic olefin copolymer. The first cyclic olefin copolymer is different from the second cyclic olefin copolymer, and a glass transition temperature of the first cyclic olefin copolymer and the second cyclic olefin copolymer is between 50 and 90° C.

According to an embodiment a use of a heat shrink label is provided. The label is used for heat shrink labelling applications. The label is used for labelling of a container comprising an uneven surface. A difference between the smallest diameter and the largest diameter of the container is between 20 and 80%, preferably between 30 and 70%. A heat shrink label may be used for labelling of batteries. According to an embodiment, a heat shrink label may be used as a part of a label laminate comprising an adhesive layer for attaching the label to an item. Label laminate may also include a release liner. The label laminate may be a pressure-sensitive label laminate. The label laminate may be a wash-off label configured to be detached form the item labelled during subsequent washing process.

According to an embodiment a heat shrink label film is provided. A face film is oriented in one direction, and includes a layer comprising first cyclic olefin copolymer and second cyclic olefin copolymer. The first cyclic olefin copolymer is different from the second cyclic olefin copolymer, and a glass transition temperature of the first cyclic olefin copolymer and the second cyclic olefin copolymer is between 50 and 90° C.

According to an embodiment a combination of a heat shrink label and an item is provided. A leading edge (end) of the label and a trailing edge (end) of the label are overlapped on the surface of the item, and the label between the leading edge and the trailing edge is next to the surface of the item.

According to an embodiment a method for providing a heat shrink label is provided. A method comprises providing a face film, stretching the face film in one direction and cooling the stretched face film so as to provide shrink potential for the face film in said one direction.

According to an embodiment a method for labelling of an item is provided. The method comprises: wrapping the label around the item, wherein the orientation direction of the face film is extending circumferentially around the item; seaming said label by gluing, laser welding, heat sealing, or ultrasonic bonding; heating the label at temperature between 65 and 80° C. so as to form a tight fitting label for the item.

According to an embodiment a method for separating a heat shrink label from an item labelled is provided. The method comprises: crushing said labelled item into pieces; exposing the pieces of labelled item to re-cycling process comprising heated liquid having a density more than density of the label and less than density of the item; collecting the separated pieces of the item sunk in the washing liquid; collecting the separated pieces of the labels floating on the washing liquid.

Further embodiments of the invention are presented in dependent claims.

The glass transition temperature of the first cyclic olefin copolymer may be different from the glass transition temperature of the second cyclic olefin copolymer. A difference in the glass transition temperature of the first cyclic olefin copolymer and the second cyclic olefin copolymer may be at most 40° C., preferably at most 30° C. The difference in the glass transition temperature of the first cyclic olefin copolymer and the second cyclic olefin copolymer may be at least 5° C., preferably at least 10° C. The glass transition temperature of the first cyclic olefin copolymer may be below 70° C. and the glass transition temperature of the second cyclic olefin is above 70° C. The at least one layer may comprise equal amounts of the first cyclic olefin copolymer and the second cyclic olefin copolymer. A ratio of the first cyclic olefin copolymer to the second cyclic olefin copolymer in the at least one layer may be between 1.5 and 8.

At least one layer may further comprise linear low density polyethylene. An amount of linear low density polyethylene may be at most 20 wt. % or at most 10 wt. % of the total weight of the at least one layer.

The multilayer face film may comprise a second layer comprising terpolymer. An amount of terpolymer may be between 20 and 95 wt. %, preferably between 40 and 90, more preferably between 50 and 80 wt. %. Terpolymer may be at least one of the following terpolymers comprising propylene: 1-butene/propylene/ethylene, propylene/ethylene/1-hexene and propylene/ethylene/1-butene. Terpolymer may be 1-butene/propylene/ethylene.

The at least one layer (first layer) may be a first skin layer of the multilayer face film. The multilayer face film may further comprise a second skin layer comprising first cyclic olefin copolymer and second cyclic olefin copolymer equal with the first skin layer. The second layer may be a core layer arranged between the first skin layer and the second skin layer.

The second layer may further comprise at least one of the following: polyolefin plastomer and polyolefin elastomer. An amount of polyolefin plastomer and/or polyolefin elastomer may be between 2 and 50 wt. %, preferably between 5 and 35 wt. % and more preferably between 10 and 30 wt. %. The second layer may comprise at least one of the following propylene/ethylene plastomer, ethylene/octene elastomer and ethylene/butene elastomer.

The multilayer face film may have a density between 0.90 and 0.98 g/cm³.

The label may be configured to shrink in the direction of the orientation of the face film at least 15%, preferably at least 25%, or preferably at least 35% at a temperature between 65 and 85° C. The label may be configured to shrink in the direction of the orientation of the face film between 20 and 70% at a temperature between 65 and 85° C. The label may be configured to shrink between 25 and 65% at a temperature between 65 and 85° C. The label may be configured to shrink less than 10% at a temperature below 65° C.

The face film may be oriented in machine direction. The face film may be oriented in transverse direction.

A difference between the smallest diameter and the largest diameter of the item is between 20 and 80%, preferably between 30 and 70%. The item may comprise polyethylene terephthalate. The item may a bottle consisting of polyethylene terephthalate.

A face film may be stretched in the one direction with a ratio of unstretched film thickness to stretched film thickness between 2 and 10. In other words, the face film may be stretched in the one direction with a stretching ratio of between 2:1 and 10:1.

DESCRIPTION OF THE DRAWINGS

In the following some examples and embodiments of the invention will be described in more detail with reference to appended drawings, in which.

DETAILED DESCRIPTION OF THE INVENTION

In this description and claims, the percentage values relating to an amount of raw materials are percentages by weight (wt. %) unless otherwise indicated. The following reference numbers and denotations are used in this application:
Sx, Sy, Sz orthogonal directions,
TD transverse direction,
CD cross direction,
MD machine direction,
DIR1 direction,
DR draw ratio,
MRK1 graphics,
L1 length of a label film prior to shrinking,
w1 width of a label film prior to shrinking,
d1 thickness of a label film prior to shrinking,
L2 length of a shrunk label film,
w2 width of a shrunk label film,
d2 thickness of a shrunk label film,
1 a label film (a face film),
2 a label,
3 a first layer (a first skin layer or front surface layer),
4 a shrunk label,
5 a second layer (a core or intermediate layer),
6 a shrunk label film,
7 a third layer (a second skin layer or back surface layer),
8 an item,
9 a leading edge of a label,
10 a seam,
11 a trailing edge of a label,
12 a labelled item,
14 a neck of a bottle.

Figure 3:
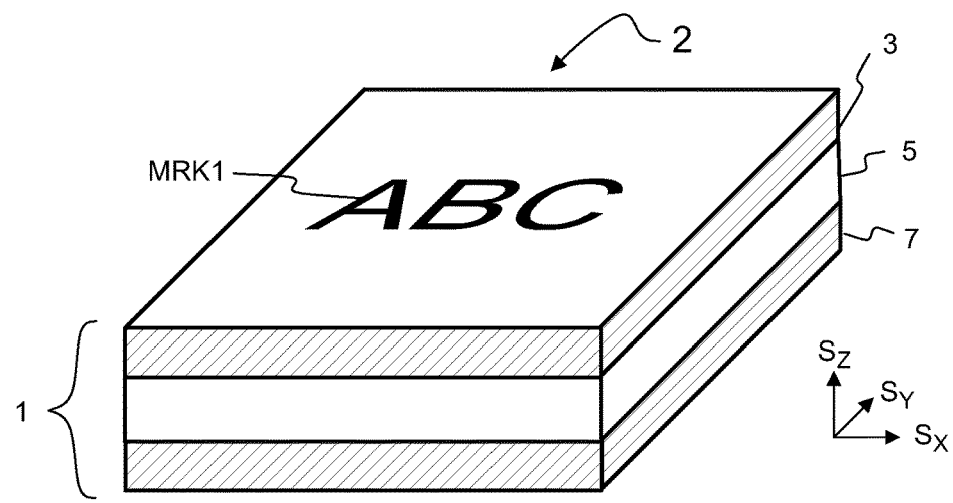
FIG. 3 shows, in a perspective view, an example embodiment of a multilayer face film of a label.

In this application term "label" refers to a piece of material, which is used for labelling of an item. Label may be used to identify something. Label may be attached to an article. In other words, label is suitable to be applied to a surface of an item to provide decoration, and/or to display information about the product being sold, such as content information, a trade name, a logo, a barcode, or any other graphics. The item may be also called as an article, or a substrate. Preferably, the label comprises a face film and at least some graphics on a surface of the face film. A face film may also be referred to as a label film. The graphics may comprise, for example, printed information and/or decoration. Referring to FIG. 3, a label 2 comprises a face film 1. At least one surface of the face film may comprise graphics MRK1. The face film may comprise or consist of a multilayer plastic film structure comprising e.g. three layers. In addition, the label may comprise adhesive. The adhesive may be used to enable the label to be attached to an item, an article or a container. In other words, "label" refers to an object having length, width and thickness. The object may be a plastic film or it may be derived from a plastic film. A label comprises a first surface portion. The first surface portion is intended to be attached to a second surface portion different from the first surface portion. The second surface portion may be a surface portion of the label different from the first surface portion, or a surface portion of another object. The first and second surface portions may be adjoined to each other by various means, such as by using an adhesive or heat, for example by welding.

Figure 4:
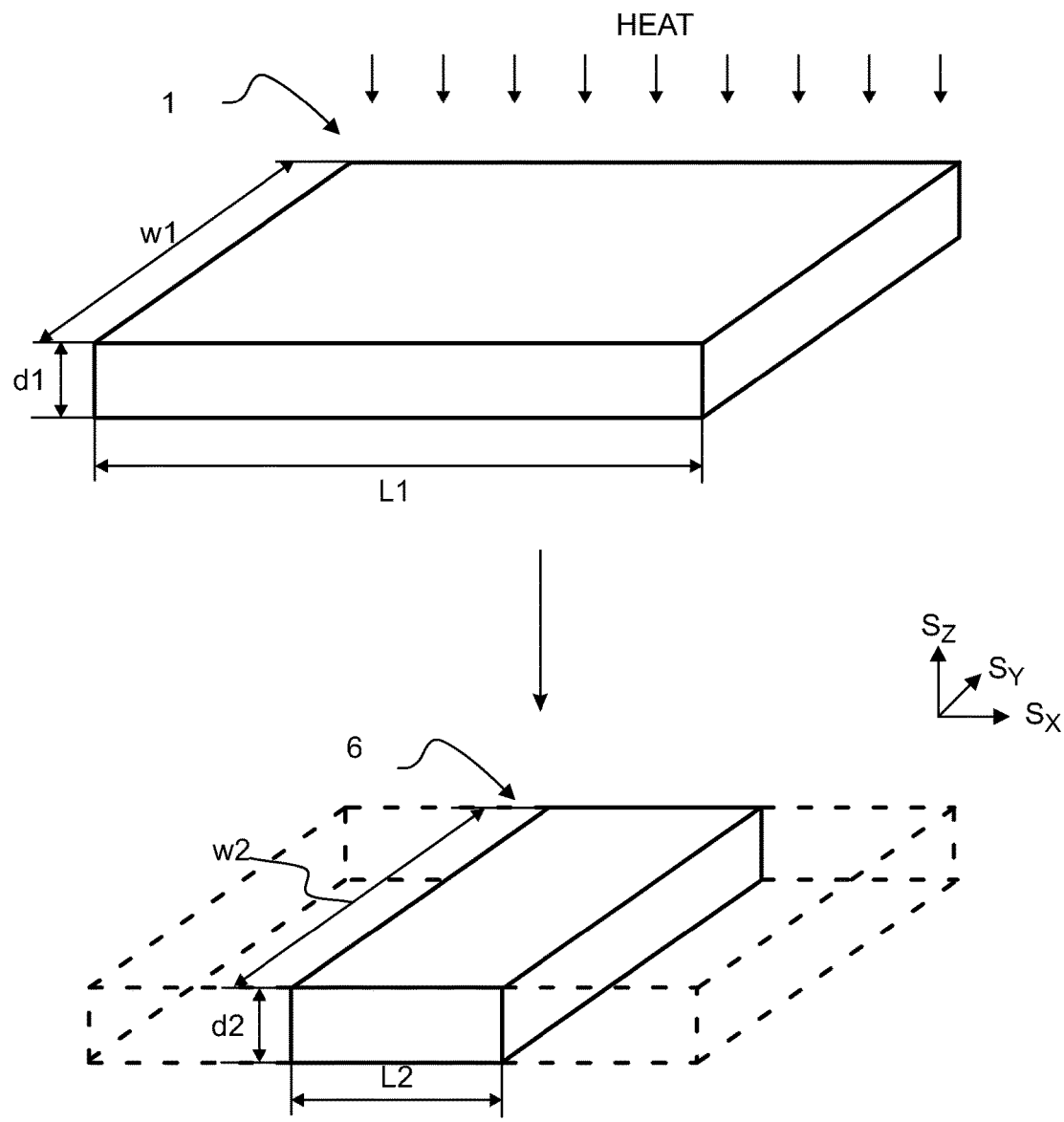
FIG. 4 shows, in a perspective view, an example embodiment of a heat shrinking of a plastic film.

Term "shrinkable" refers to a property of a plastic film or a label made thereof to shrink under exposure to external energy. Referring to FIG. 4, a heat shrinkable plastic film, such as a face film 1 of a label, may shrink when exposure to an elevated temperature. Heat may be applied via hot air. In response to application of heat, the heat shrink plastic film or a label comprising said plastic film is arranged to shrink. Film shrinkage may be focused on a local area or to the whole plastic film area. Heat shrink film or heat shrink label refers to a film or label having at least 15% preferably at least 25% or at least 35% shrinkage between temperature of 65 and 80° C. Below 65° C. shrinkage is less than 10%, preferably less than 5%, for example between 0 and 10%, or between 0.5 and 5%. Film(s) which are not able to shrink as presented above are not suitable for face films of labels and are thus not suitable for heat shrink labelling applications. A heat shrinkable label comprises or consists of a face film configured to shrink between 20 and 70%, preferably between 25 and 65% at a temperature range between 65 and 85° C. In addition, the heat shrinkable label comprises or consists of a face film configured to shrink less than 10% at temperature below 65° C.

Preferably, a heat shrink label comprises a multilayer face film (label film) comprising or consisting of heat shrink plastic film layer(s). In addition, the shrink label comprises at least some graphics on a surface of the face film. In addition, the shrinkable label may comprise an adhesive. The adhesive may be applied only in a joint area of cylindrical label, wherein the opposite edges of the face film are overlapping. For example, the adhesive may be applied between the overlapping edges. Alternatively or in addition, the adhesive may be applied between the face film and surface of an item to be labelled. Shrinkage of label may be focused on a local area or to the whole label area. Local shrinkage may be focused on required areas, for example on an edge area of a label. Whole label may be shrunk in a direction extending circumferentially around a container to conform to the outside (external) shape of the container. Local shrinkage may be focused on required areas, for example on an edge area of an article.

Figure 2:
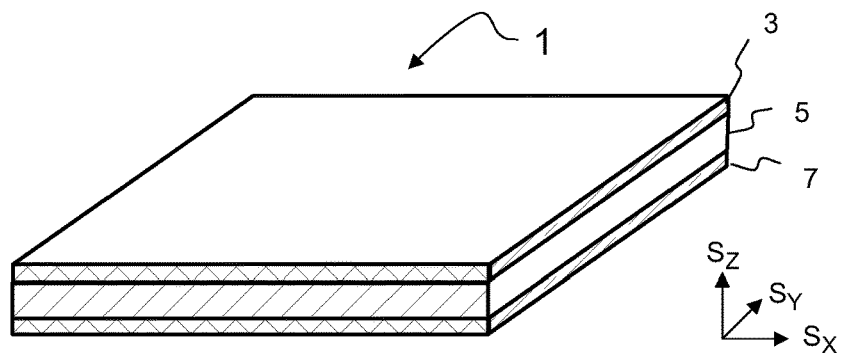
FIG. 2 shows, in a perspective view, an example embodiment of a multilayer face film for a label.

Term "machine direction" MD refers to the running direction $S_x$ of the plastic film or continuous label web during label manufacturing. "Transverse direction" TD or "cross direction" CD refers to the direction $S_y$ perpendicular to the running direction $S_x$ of the film or label web. Directions are shown, for example, in FIG. 2.

A ratio of total film thickness before and after stretching is called a "draw ratio" or "drawing ratio" (DR). It may also be referred to as a stretching ratio or orientation ratio. In other words, draw ratio is a non-oriented (undrawn) film thickness in relation to the oriented (drawn) film thickness. The non-oriented film thickness is the thickness after extrusion and subsequent chilling of the film. When stretching the film, the thickness of the film may diminish in the same ratio as the film stretches or elongates. For example, a film having thickness of 100 micrometers before uniaxial orientation is stretched by a draw ratio of 5. After the uniaxial orientation the film may have a fivefold diminished thickness of 20 micrometers. Thus, the draw ratio (orientation ratio) is 5.

The plastic film may be drawn (stretched) at least in one direction. The film may be drawn in a machine direction, in a transverse direction, or both. The resulting film is thus monoaxially (uniaxially) oriented (MO) or biaxially oriented (BO). Monoaxially oriented film may be machine oriented (MDO) or transverse oriented (TDO) in accordance to the direction of the orientation (stretching).

During stretching the randomly oriented polymer chains of the extruded films are oriented in the direction of stretching (drawing). Orientation under uniaxial stress provides orientation of polymer chains of the plastic film in the direction of stress provided. In other words, the polymer chains are oriented at least partially in the direction of stretching (drawing). In this application, machine direction (MD) refers to the running direction ($S_x$) of the film during manufacturing, as shown for example in FIG. 2. The degree of orientation of the polymer chains depends on the drawing ratio of the film. In other words, the polymer chains in the film stretched with a higher draw ratio are more oriented when compared to the films stretched with lower draw ratio. The orientation, like orientation direction, amount and ratio, may have effect on properties of the film, and/or the label comprising the film. The stretching of the film and orientation of the polymer chains may be observed microscopically.

Further, the orientation is detectable e.g. from the mechanical properties of the films, such as values of modulus and/or tensile strength.

Haze is a property used to describe transparency of a plastic film or a face stock of label consisting of the plastic film. Haze relates to scattering of light by a film that results in a cloudy appearance of the film. Haze corresponds to the percentage of light transmitted through a film that is deflected from the direction of the incoming light. Haze may be measured according to standard ASTM D1003.

Term "roll-fed shrink film" (RFS) refers to labelling process, where a ready cut label is rolled over a container and then the label is shrunk in order to conform shape and size of the container. Label is supplied from a reel, cut into individual labels and applied around an item. Adhesive (e.g. hot melt adhesive) is used to hold the label on the surface of the item. The adhesive may be applied on the label or on the container in an area between the leading edge and the surface of the container. The adhesive may also be applied between trailing and leading edges of the label. When rolled over to an item, the trailing and leading edges may overlap and form a seam. Subsequent shrinking process at high temperatures enables tight fitting of the label around the item. Heat shrinking may occur at a shrink tunnel, where for example hot air may be blown towards passing items. The described process may be called as on-line labelling process. Roll-fed shrink films may be uniaxially oriented in machine direction (MD). Alternatively, films may be uniaxially oriented in transverse direction. When a label consists of a MDO shrink film as a face stock, and the machine direction of the label extends circumferentially around the item, the label is arranged to shrink primarily in the orientation direction when heated.

Term "shrink-sleeve" or "heat shrinkable sleeve film" (HS) refers to a labelling process, where a preformed label tube (or sleeve) is introduced around an item. Shrink sleeve label comprises or consists of transverse direction oriented (TDO) shrink film. The film is solvent seamed into a continuous tube label around the axis extending to the machine direction ($S_x$). The formed continuous tube (or sleeve) is cut into predetermined lengths and supplied as a form of individual tube label around an item. The item or container may be warmed before a cylindrical tube label is introduced over it. Tube around an item is heated in order to shrink the tube label around the item. The transverse direction orientation of the tube label extends circumferentially around the item. Thus, label primarily shrink in the transverse direction.

Figure 1:
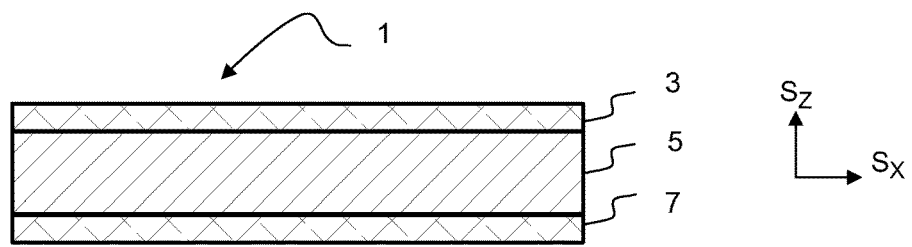
FIG. 1 shows, in a cross sectional view, an example embodiment of a multilayer face film for a label.

A label film (face film) may have a monolayer structure. Referring to FIG. 1, the label film may have a multilayer structure comprising two or more plastic film layers. Preferably, a face film of a label consists of a multilayer plastic film structure.

Referring to FIG. 1, the multilayer label film structure 1 may comprise a first layer 3, a second layer 5 and a third layer 7. Preferably the second layer 5 is between the first 3 layer and the third 7 layer. In a three layer structure, the second layer 5 is an intermediate layer. The intermediate layer may also be referred to as a core layer. The first layer 3 and the third layer 7 may be also referred to as skin layers, i.e. a first skin layer and a second skin layer, respectively. The first skin layer and the second skin layer may also be referred to as a front surface layer and a back surface layer, respectively. The front surface layer may be an outermost layer of the multilayer structure when labelled to a surface of an item. However, the front surface may further be over coated. For example, in order to protect the printed graphics.

The back surface layer may be the layer adjacent to a surface of an item. Alternatively, a label may be attached to an item via adhesive on its front surface. In this alternative, back surface may be the outermost layer of the labelled item. Alternatively the back surface may be covered, varnished or over-coated. Preferably the multilayer structure has symmetric structure. For example, symmetric three layer structure comprises identical skin layers on opposite sides of the core layer. Alternatively, the multilayer structure may be asymmetrical. For example, one skin layer may have more or less additives, e.g. anti-block or slip-agent, than the other skin layer. The film structure may also comprise additional layers, such as tie layers or protective layers. The multilayer structure may be laminated or coextruded.

The core layer 5 may form major portion of the multilayer film structure. The core layer may have a monolayer or multilayer structure. The core layer may be thicker than the first skin layer and the second skin layer. For example, the core may form 60% of the total thickness of the multilayer structure. Alternatively, the core may have thickness of 40% of the total thickness of the multilayer film. In a three layer symmetric film, the core layer having thickness of 40% of the total thickness of the film still forms major portion of the film, since the skin surfaces may have thickness of up to 30% of the label thickness each. Thickness of the core layer may be from 15 to 50 microns, or from 20 to 50 microns, preferably around 30 or 25 microns. Thickness of skin layers may be 40% of the total thickness of the multilayer structure. Alternatively, thickness of skin layers may be 60% of the total thickness. The thickness of a skin layer may be less than 20 microns, preferably around 10 or 7.5 microns or less. The overall thickness of the multilayer film may be from 20 to 70 microns or from 25 to 60 microns, preferably around 50 microns or around 40 microns or less. Preferably the multilayer film has uniform overall thickness. Uniform thickness refers to a homogeneous thickness of a film, wherein a thickness variation along the film is small. For example in a film area of 100 mm*100 mm variation of the film thickness is less than 10%, preferably between 0.1 and 5.0%. Uniform thickness of the film provides better quality labels, for example, labels having good visual appearance. Uniform film thickness may have effect on the register control and image quality of the printing.

The multilayer plastic film structure may comprise or consist of layers having different compositions. For example, skin layer(s) may have different composition when compared to the composition of the core layer. Also first and second skin layers may have different compositions. Alternatively, the first and second skin layers may have similar compositions.

According to an embodiment, a skin layer(s) may comprise a first cyclic olefin copolymer $COC_1$ and a second cyclic olefin copolymer $COC_2$. The cyclic olefin copolymer contains polymerized units derived from at least one cyclic and at least one acyclic olefin. The cyclic olefin may comprise at least 4 carbon atoms and a unsaturated site for coordinated polymerization with the acyclic olefin. The cyclic olefin may comprise an unsubstituted or substituted ring. The acyclic olefin may be an alpha olefin having two or more carbon atoms. Cyclic olefin copolymers may be based on cyclic monomers, such as norbornene and/or tetracyclododecene. Cyclic monomer(s) may be chain copolymerized with ethene (ethylene). For example, cyclic olefin copolymer may be comprise monomers of norbornene and ethene. Alternatively, cyclic olefin copolymer may comprise monomers of tetracyclododecene and ethene. Cyclic olefin copolymer may also consists of monomers of norbornene, tetracyclododecene and ethene. Alternatively, cyclic olefin monomer may be at least one of the following: cyclobutene, cyclopentene, cyclooctene, 5-methylnorbornene, 3-methylnorbornene, ethylnorbornene, phenylnorbomene, dimethylnorbornene, diethylnorbornene, dicyclopentadiene, methyltetracyclododecene, 6-methylnorbornene, 6-ethylnorbornene, 6-n-butylnorbornene, 5-propylnorbornene, 1-methylnorbornene, 7-methylnorbornene, 5,6-dimethylnorbornene, 5-phenylnorbornene, 5-benzylicnorbornene, 8-methyltetracyclo-3-dodecene, 8-ethyltetracyclo-3-dodecene, 8-hexyltetracyclo-3-dodecene, 2,10-dimethyltetracyclo-3-dodecene and 5,10-dimethyltetracyclo-3-dodecene.

Preferably, the first cyclic olefin is different from the second cyclic olefin. A glass transition temperature of the first cyclic olefin copolymer and the second cyclic olefin copolymer is between 50 and 90° C. A difference in the glass transition temperature of the first cyclic olefin copolymer and the second cyclic olefin copolymer may be at most 40° C., preferably at most 30° C. The difference in the glass transition temperature of the first cyclic olefin copolymer and the second cyclic olefin copolymer may be at least 5° C., preferably at least 10° C. The glass transition temperature of the first cyclic olefin copolymer may be below 70° C. and the glass transition temperature of the second cyclic olefin may be above 70° C. For example, the first cyclic olefin copolymer $COC_1$ may have glass transition temperature of 65° C. measured according to standard ISO 11357-1, -2, -3 with heating rate of 10° C./min. The second cyclic olefin copolymer may have a glass transition temperature of 78° C. Melt volume rate tested according to standard ISO 1133 at 230° C. with test load of 2.16 kg of $COC_1$ may be 6.0 cm$^3$/10 min. Melt volume rate of $COC_2$ may be 11.0 cm$^3$/10 min. Density of $COC_1$ and $COC_2$ may be 1010 kg/m$^3$, when measured according to standard ISO 1183.

At least one skin layer may comprise equal amounts of the first cyclic olefin copolymer and the second cyclic olefin copolymer. For example, a ratio of the first cyclic olefin copolymer to the second cyclic olefin copolymer $COC_1$/$COC_2$ may be between 1.5 and 8. For example, an amount of first cyclic copolymer may be between 40 and 80 wt. % and an amount of second cyclic olefin copolymer may be between 8 and 35 wt. %. Amount of cyclic olefin copolymer(s) in skin layer(s) may be at least 50 wt. %, or at least 60 wt. %. Amount of cyclic olefin copolymer(s) may be up to 100 wt. %, or at most 98 wt. %, or at most 90 wt. %. For example, an amount of cyclic olefin copolymer(s) may be between 50 and 100%, or between 50 and 90 wt. %, or between 60 and 90 wt. %.

The first and second cyclic olefin copolymers according to embodiments may have effect on the shrinking behaviour of the film. For example, a specific shrinkage curve may be achieved with the at least some/all embodiments.

In addition, skin layer(s) may comprise linear low density polyethylene (LLDPE). Preferably, the LLDPE is Ziegler-Natta catalyst based. For example, LLDPE may be a copolymer of ethylene and 1-octene. Density of LLDPE may be 0.916 g/cm$^3$, when measured according to standard ASTM D792. Melt Index may be 2.0 g/10 min, when measured according to standard ASTM D1238 at 190° C./2.16 kg. Alternatively, metallocene-catalysed LLDPE may be used. For example, ethylene-hexene copolymer having density of 0.918 g/cm$^3$ and melt index 2.0 g/10 min, when measured according to standard ASTM D1238 at 190° C./2.16 kg.

For example, an amount of linear low density polyethylene may be at most 30 wt. %, or at most 20 wt. %, or at most 10 wt. % of the total weight of the skin layer. As an example, minimum amount of LLDPE may be between 5 and 10 wt. %. An amount of LLDPE may be between 0 and 30 wt. %, or between 5 and 20 wt. %, or between 10 and 20 wt. %. LLDPE has effect of reducing or avoiding the finger marking effect of the film. LLDPE may have effect of reducing un-wanted visual appearance, for example due to reducing or avoiding the finger marking effect of the film. LLDPE may have an effect of providing good interlayer attachment.

Further, skin layer(s) may contain additives, such as inorganic fillers, pigments, antioxidants, ultraviolet absorbers, anti-blocking agents, slip additives, antistatic additives, cavitating agents. For example, the first skin layer may comprise anti-blocking agent. An amount of anti-blocking agent may be between 0.5 and 5 wt. %, preferably between 1 and 3 wt. % or between 2 and 3 wt. %.

An intermediate layer 5 may contain at least one terpolymer. Terpolymer may be at least one of the following terpolymers comprising propylene: 1-butene/propylene/ethylene, propylene/ethylene/1-hexene and propylene/ethylene/1-butene. 1-butene/propylene/ethylene terpolymer may comprise more 1-butene monomer units when compared to the propylene/ethylene/1-butene. As an example, propylene terpolymer may have a density of 0.90 g/cm$^3$, when measured according to standard ISO 1183. Melt flow rate may be 5.5 g/10 min, when measured according to standard ISO 1133 at 230° C./2.16 kg. Alternatively the melt flow rate may be 0.9 g/10 min.

An amount of terpolymer(s) may be between 20 and 95 wt. %, preferably between 40 and 90, more preferably between 50 and 80 wt. %. For example 50, 55, 60, 65, 70, 75 or 80 wt. %. Terpolymer(s) may have effect on the orientation behaviour of the film. Terpolymer(s) may reduce the softening point of the film thus improving the stretching of the film. For example, films comprising terpolymer(s) may be stretched at a lower temperature. In addition, higher orientation ratios may be achieved, which may have effect on the shrinkage potential of the film. In a core layer of the film terpolymer(s) may have an effect on increasing the strength of the film. In addition, terpolymer(s) may have an effect on providing more stability for the film, which is advantageous during orientation process e.g. in avoiding the film tearing away from the grippers holding the film, particularly for orientation in the transverse direction.

In addition, the intermediate layer 5 may contain polyolefin plastomer and/or polyolefin elastomer. The intermediate layer may comprise at least one of the following: propylene/ethylene plastomer, ethylene/octene elastomer and ethylene/butene elastomer. Polyolefin elastomer may have density of 0.863 g/cm$^3$, when measured according to standard ASTM D729. Alternatively, density may be 0.867 g/cm$^3$. Melt flow rate may be 8.0 g/10 min, when measured according to standard ASTM D1238 at 230° C./2.16 kg. For example, polyolefin plastomer may have a density of 0.867 g/cm$^3$ and melt flow rate of 8.0 g/10 min. An amount of polyolefin plastomer and/or elastomer may be between 2 and 50 wt. %, preferably between 5 and 35 wt. % and more preferably between 10 and 30 wt. %. The core layer may comprise for example, total amount of 10, 15, 20, 25 or 30 wt. % polyolefin elastomer and/or polyolefin plastomer. Polyolefin elastomer(s) and or plastomer(s) may have a positive effect on the ability of the film to be stretched (oriented) and thus on the shrinkage potential of the film.

According to an embodiment, the intermediate layer may contain cyclic olefin copolymer. An amount of cyclic olefin copolymer may be 5 wt. %, 10 wt. %, or 20 wt. %, preferably less than 30 wt. %. For example, between 0 and 30 wt. %, or between 5 and 20 wt. %, or between 10 and 20 wt. %. The cyclic olefin copolymer in the intermediate layer may have effect on achieving good adhesion between the intermediate layer with skin layer(s). In addition, the cyclic olefin copolymer contained in the intermediate layer may have effect of increasing the overall shrinkage of the film. The intermediate layer according to embodiment may not resist shrinking of the film.

According to an embodiment, the multilayer film comprising at least a core layer, a first skin layer and a second skin layer is uniaxially oriented, i.e. stretched only in one direction. A film may be oriented in machine direction (MD). A film oriented in a machine direction provides controlled shrinkage of the film in MD direction during subsequent shrinking process. Alternatively, the films may be oriented in transverse direction (TD), so as to provide uniaxially in transverse direction oriented films having controlled shrinkage in transverse direction.

Unoriented multilayer films may be manufactured by using either a cast or blown-film extrusion process. A shrinkable multilayer film may be obtained by stretching (drawing) the extruded multilayer film to an extent several times its original dimension to orient the film. Stretching may be designated also as orienting. The stretching may be performed by using heated draw rolls with gradually increasing speed. The stretching may be performed below the melting temperature of the polymer and/or at or near the glass transition temperature of the polymer. Preferably the film stretching temperature is between 50 and 120° C., preferably between 60 and 110° C. or between 60 and 100° C. After stretching, the film may be cooled with one or more cooling rolls having decreasing temperature profile starting at or just below stretching temperature and decreasing gradually to around room temperature. Stretching and subsequent cooling may provide suitable shrink potential for the film. Due to the shrink potential, the oriented films are able to shrink under elevated temperature towards the non-oriented (initial) state of the film.

According to an embodiment, the stretching is performed in one direction of the film, e.g. in machine direction, i.e. in longitudinal direction of the film. Films stretched in machine direction may be referred to as machine direction oriented (MDO) films. In MDO films the polymer chains are oriented uniaxially in said machine direction. Machine direction oriented films may be used for roll-fed labelling, i.e. in a labelling process where the label film is supplied from a reel, cut into separate labels, after which labels are mounted around an item and seamed during labelling step using adhesive, such as UV-acrylic hot-melt adhesive. Alternatively seam may be formed by solvent seaming, hot-bar (heat-sealing), laser-welding or ultrasonic radiation. During mounting the label around an item some adhesive may be used between the label and the surface of the item in order to keep the label in specified place. The label around the item may be shrunk in order to form a tight attachment and/or to conform the shape of the item.

Alternatively, the film may be stretched in transverse direction (TD), which means the direction perpendicular to machine direction of the film. Transverse direction (TD) may be referred also to as cross direction (CD). Transverse oriented films may be used for shrink-sleeve type of labels, which films are seamed into a form of a tube prior to labelling. The tube is cut into tubes of predetermined lengths and supplied as in a form of tube around an item. The labelled item may be heated in order to provide shrinking of the film around the item and/or to provide tight fitting of the label around the item and/or to conform the shape of the item with the label.

The stretched (oriented) structure of the film and orientation of the polymer chains may be observed microscopically. Further, the orientation is detectable e.g. from the mechanical properties of the films, such as values of modulus and/or tensile strength.

The film may be uniaxially oriented approximately from 2 to 10 times, preferably 3 to 9 times, and most preferably from 3 to 8 times. The film may be uniaxially oriented in machine direction. Draw ratio (or orientation ratio) of the MD film is from 2 to 10 (from 2:1 to 10:1), preferably from 3 to 9 (from 3:1 to 9:1), most preferably from 3 to 8 (from 3:1 to 8:1), correspondingly. Alternatively, the film may be uniaxially oriented in transverse direction, for example, from 2 to 10 times, preferably 3 to 9 times, and most preferably from 3 to 8 times.

For example, the films may be oriented at least 3 times at least in one direction, i.e. the draw ratio (stretching ratio) of the film is at least 3 in one direction of the film. Alternatively, the orientation ratio at least in one direction may be at least 4. For example, the draw ratio may be between 3 and 7, preferably between 4 and 6.

After the stretching the film is not heat set, i.e. not annealed, to provide maximum shrinkage for the multilayer shrink film. After stretching at elevated temperature the oriented film is immediately cooled by passing the film through cooling rolls. Cooling of the film may be gradual. After stretching, the film may be cooled with one or more cooling rolls having decreasing temperature profile starting at or just below stretching temperature and decreasing gradually to around room temperature. Consequently, subsequent application of heat causes the oriented film to relax and the oriented film may return towards or substantially back to its original unstretched dimensions. Thus, machine direction oriented films primarily shrink in the machine direction and transverse oriented films in the transverse direction.

Referring to FIG. 4, not heat set, uniaxially oriented face film 1 having dimensions of length L1, width w1 and thickness d1, is arranged to shrink under application of heat so as to form a shrunk face film 6. Uniaxial orientation direction $S_x$, of the film is parallel to the film length L1 and L2. Uniaxial orientation direction may be, for example, machine direction MD. Alternatively, uniaxial direction may be transverse direction TD. The corresponding film dimensions are length L2, width w2 and thickness d2 after shrinking. Under heating the uniaxially oriented film 1 is capable of shrinking in the direction of the orientation $S_x$. In other words, the length of the film reduces, when heating is applied, i.e. L1>L2. If the film is oriented only in one direction Sx, in the perpendicular direction $S_y$, the dimension w1 is substantially equal to w2 after heat treatment. Same applies to the labels comprising uniaxially oriented face film.

The oriented multilayer label films, i.e. shrink films may be printed in order to provide visual effect and/or to display information. Printing may be performed by using traditional printing processes, for example, flexographic, gravure offset, and digital printing methods, such as liquid-toner, dry-toner or ink-jet processes. The multilayer film may comprise printing on an outer surface of a first skin layer 3. Alternatively the reverse side of the multilayer structure may be printed, i.e. a third layer 7 may comprise the printing. Thus the graphic patterns may be printed on at least one of the skin layers of the multi-layered film. When printing the second skin layer 5 of the film, the film may be referred to as reverse-printed. During labelling the reverse-printed film the printing is in direct contact with a surface of an item to which the film is applied. The print is viewed through the multilayer film. With these kind of films no further layers are needed to protect the printing e.g. from abrasion or scratching during handling of the labelled items.

According to an embodiment, the multilayer plastic film is clear i.e. transparent to visible light. Clear multilayer shrink films and labels comprising said films have good visual appearance. For example, said films may provide no-label look or appearance, when attached to the surface of an item. The clear no-label look allows the objects beneath such label, i.e. the bottle or contents, to be visible through such label. Clarity of the film and a label comprising said film can be measured and evaluated by the haze values. The overall haze of the multilayer film and label consisting of said multilayer film may be less than 25%, preferably less than 15%, and most preferably less than 10% when measured according to the standard ASTM D1003. For example, the haze of the face film may be between 2 and 10%, or between 5 and 10%.

According to another embodiment, initially clear face film of a label may be printed on the reverse side of the face film and the printing is visible through the face film. Thus, the printing is adjacent to the surface of the labelled item and as such protected, for example, from scuffing. The printing may be multi-layered comprising two or more printing layers. For example, colour printing at the film surface may be covered (overprinted) with a white or some other colour printing. Thus, the overprinting is next to the surface of the item. Through this kind of label the object beneath is not visible.

The multilayer films are suitable for printing. Preferably the films enable high printing quality. The films have excellent ink adhesion and register control, allowing for example gravure printing. According to an embodiment, the face film surface may be treated prior to printing. The print receiving surface may be treated by flame treatment, corona treatment, or plasma treatment in order to increase the surface tension of the surface and to enhance, for example, adhesion of the printed graphics. A low surface tension may lead to poor retaining capability of printing ink applied to the surface. Surface tension of the print receiving skin layer may be higher than or equal to 38 mN/m, for example 44 mN/m, when measured according to standard ISO 8296. For example, the print receiving skin layer may have a surface tension at least 36 dynes/cm, preferably at least 38 dynes/cm or at least 44 dynes/cm measured according to the standard ASTM D-2578. The surface tension may be between 36 and 60 dynes/cm, preferably between 38 and 56 dynes/cm or between 44 and 50 dynes/cm.

The multilayer films and labels comprising said films have controlled shrinkage, i.e. specific amount of shrinkage at specific temperature range. The films have an ability to shrink upon exposure to external energy, e.g. some level of heat. Shrinkage of the film is activated when the film is treated e.g. at elevated temperatures, such as passed through a hot air or steam-tunnel. The shrink performance, i.e. shrinking capacity (potential) of the films in the stretching direction is very high at elevated temperatures. Preferably, overall shrinkage may be over 50% at temperature range from 65 to 90° C. or from 70 to 85° C.

Shrinkage may be measured according to the following method: providing a sample with measured and marked 100 mm*100 mm area, placing the sample for 15 seconds to the water baths having temperatures at intervals of 5° C. from 55° C. to 98° C., cooling the sample at water bath having temperature of around room temperature, drying the sample and measuring the dimensions of the marked area of the sample. Preferably at least 3 or more parallel samples are used. Shrinkage is determined as the relative change of dimensions. The term "shrinkage" is defined with reference to the method; however, it is evident, and has been noticed, that the same shrinkage properties apply regardless of the method, provided that the same temperatures are used. I.e. the composition of heat transfer medium (air, steam, water) is not critical for shrinkage behaviour.

In the following, $L_0$ corresponds to previously presented L1 and $L(T)$ corresponds L2. Further, the following denotations are used $\varepsilon$ strain (when positive) or shrinkage (when negative), $\varepsilon(T)$ shrinkage of a film, after a heat treatment wherein the temperature of the thermally shrinkable plastic film has been T, defined as $\varepsilon(T)=[L(T)-L]/L$. For thermally shrunk materials $\varepsilon(T)<0$.

$\varepsilon(98°$ C.) shrinkage of a film, after a heat treatment wherein the temperature of the thermally shrinkable plastic film has been 98° C., $\varepsilon_r(T)$ relative shrinkage of a film, defined as $\varepsilon(T)/\varepsilon(98°$ C.), a, b, c constants, f functions, $S_y$ a second direction of the film, in the plane of the film, and perpendicular to $S_x$, $L_{p0}$ a length of a film, in a second direction, before heat treatment, wherein the second direction is perpendicular to the first direction and is in the plane of the film, $L_p(T)$ the length of the a part of the film in the second direction after a heat treatment, in which the temperature of the thermally shrinkable plastic film is T, the part of the film having the length $L_p$ in the second direction before heat treatment, $\varepsilon_p(T)$ shrinkage or strain of a film in the second direction, after a heat treatment, in which the temperature of the thermally shrinkable plastic film has been T, after cooling the sample back to the temperature before the heat treatment, defined as $\varepsilon_p(T)=[L_p(T)-L_p]/L_p$, pp percentage point, i.e. the absolute difference of relative values given in percents, $A_2$, $A_1$ cross sectional areas of a part that is encircled by a loop formed from the film, $\rho_1$ density of a body that has been labeled or is to be labeled, $\rho_2$ density of a label, $A_{bl}$ an area between a label and a body.

The shrinkage $\varepsilon(T)$ for the temperature T is defined as the relative change in length in the first direction; i.e. $\varepsilon(T)=(L(T)-L_0)/L_0$. In a similar way, in the second direction, another shrinkage $\varepsilon_p(T)=(L_p(T)-L_{p0})/L_{p0}$, can be defined. It is noted that by this definition, the numerical value of shrinkage is negative, while the numerical value of strain would be positive. Thus a "better" shrinkage is, in terms of numbers, a more negative (i.e. a smaller) value. As is implicitly clear, in practical applications a thermally shrinkable film 1 can be shrunk using different heat sources such as hot air, hot gas, steam, and/or radiation. Thus, in practice, drying is not necessarily needed.

Figure 9:
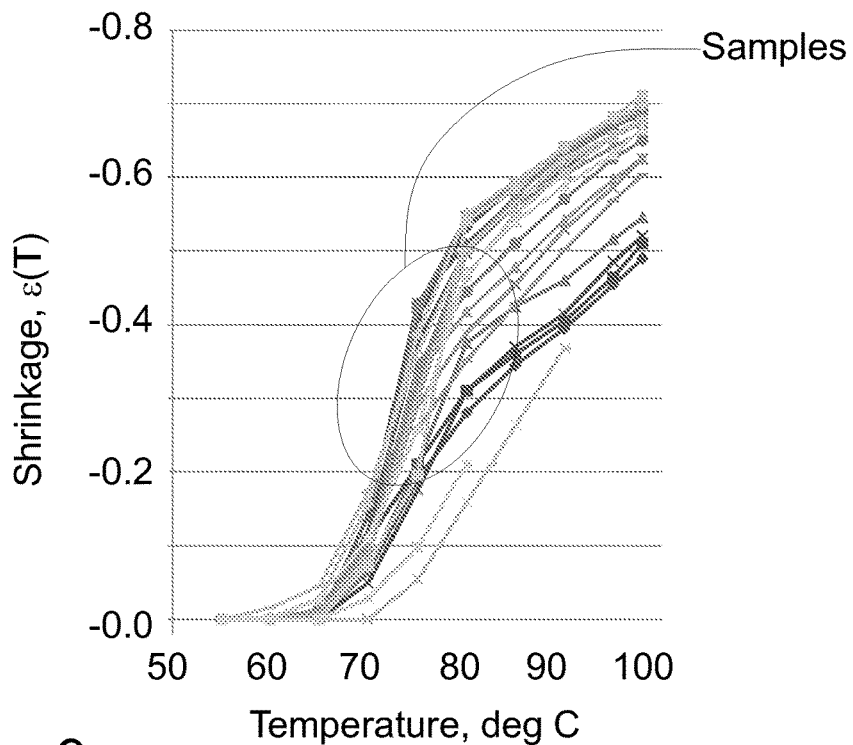
FIG. 9 shows examples for shrinkage for embodiments of heat shrinkable label films according to the present invention.

In FIG. 9, the shrinkage curves of different samples according to embodiments of the invention are shown; with the reference "Samples". In total 21 samples were manufactured and measured.

Figure 10:
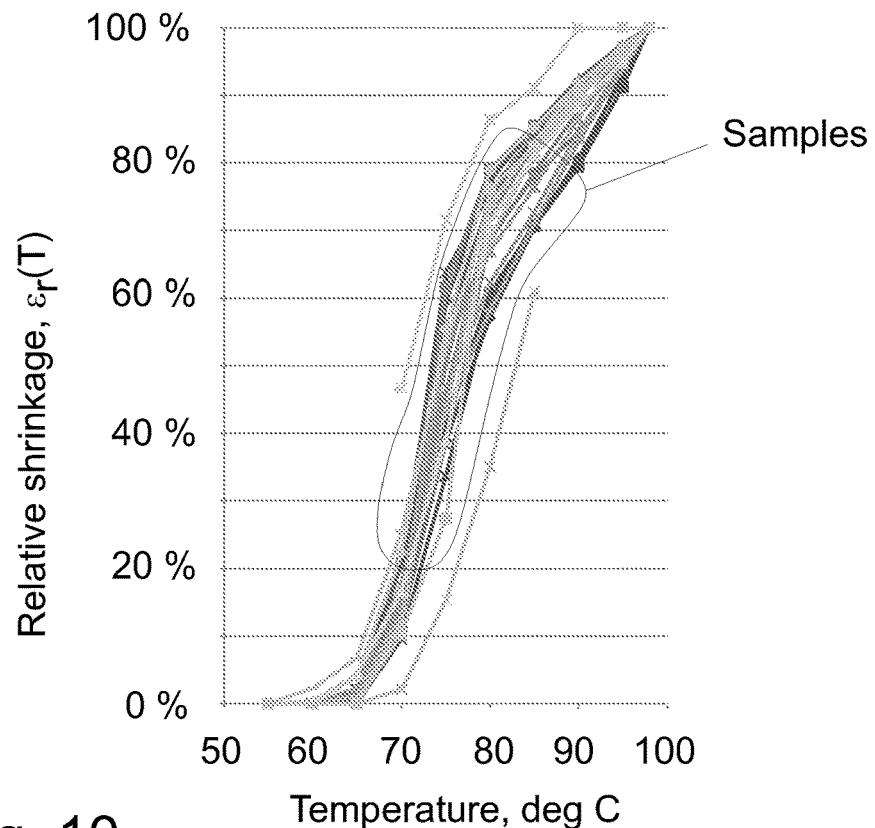
FIG. 10 shows examples for relative shrinkage for embodiments of heat shrinkable label films according to the present invention.

The values of relative shrinkage of different samples according to embodiments of the invention are shown in FIG. 10 with the reference "Samples". In total 21 samples were manufactured and measured.

Referring to FIGS. 9 and 10, the film should use most of its shrinkage potential for a reasonable small temperature change. To more precisely define the shrinkage potential, a relative temperature dependent shrinkage $\varepsilon_r(T)$ is herein defined as $\varepsilon_r(T)=\varepsilon_r(T)/\varepsilon(98°$ C.)=$\{[L(T)-L_0]/L_0\}/\varepsilon(98°$ C.). In this description, the value of $\varepsilon_r(T)$ will be given in percentages. The reason for selecting the reference temperature of 98° C. is that such a temperature is achievable using hot water or unpressurized (pressure equals 1 atm) steam. It is noted that the film may shrink also for temperatures above 98° C., however these are of little practical interest, since the films are commonly heated by water and/or steam. So, the value $\varepsilon(98°$ C.) is not a maximum shrinkage, only a reference value.

When the film uses most of its shrinkage potential for a reasonable small temperature change, the difference $\varepsilon_r(T_2)-\varepsilon_r(T_1)$, between the values of the relative temperature dependent shrinkage $\varepsilon_r(T)$ for at least one pair of two temperatures $T_2$ and $T_1$, the temperatures having a difference $T_2-T_1=15°$ C., is more than 50 percentage points (pp); wherein the lower of the two temperatures, $T_1$, is from 65° C. to 70° C. For example, the lower of the two temperatures, $T_1$, may be 65° C., whereby $\varepsilon_r(80°$ C.)$-\varepsilon_r(65°$ C.) is more than 50 pp. For example, the lower of the two temperatures, $T_1$, may be 70° C., whereby $\varepsilon_r(85°$ C.)$-\varepsilon_r(70°$ C.) is more than 50 pp. Preferably, the difference between the values of the relative temperature dependent shrinkage $\varepsilon_r(T)$ for at least the pair of temperatures $T_2=85°$ C. and $T_1=65°$ C., i.e. $\varepsilon_r(T_2)-\varepsilon_r(T_1)$, is more than 65 pp; preferably more than 70 pp.

In addition or alternatively to the shrinkage $\varepsilon(T)$, the shrinkage behavior can be described using the relative shrinkage $\varepsilon_r(T)$ as defined above. In addition or alternatively to the shrinkage $\varepsilon(T)$, as discussed above, the relative shrinkage $\varepsilon_r(T)$ is preferably between limiting values in some specific temperatures.

First, for low temperatures, the relative shrinkage should be reasonably low. This is because the temperature during transportation may rise such that some shrinkage occurs. Thus, even if the film, when applied on a body, has already shrunk to some extent, the shrinkage potential of the film is still high, since the relative shrinkage is low.

Second, for high temperatures, the relative shrinkage should be reasonably high. This is because films that are purposely heat treated have preferably used most of their shrinkage potential. For example, when the crushed film floats on water, e.g. hot water, the crushed pieces are preferably not further shrunk on the water. For example, the crushed pieces may be collected using a sieve having a size, and further shrinking of the pieces might make the smaller than the sieve size. Thus their collection might become hard. Furthermore, the further shrinking, as discussed, might curve or bend the crushed pieces, and the further utilization of such curved pieces might be more problematic than the utilization of planar pieces. The heat shrunk label would not have too much residual shrinkage potential left. High shrinkage potential of the label may be harmful when heated liquid (having a temperature around 80° C.) is used during the separation process, which will cause e.g. curling of the label into tight tubes blocking the washing apparatus.

According to an embodiment, a heat shrinkable (thermally shrinkable) label film having a first length $L_0$ in a first direction before heat treatment and a second length $L(T)$ in the first direction after heat treatment wherein the temperature of the thermally shrinkable label film has been T, whereby the thermally shrinkable label film has a temperature dependent shrinkage $\varepsilon(T)=[L(T)-L_0]/L_0$, wherein the shrinkage of the thermally shrinkable label film, after a thermal treatment such that the temperature of the thermally shrinkable label film has been T=98° C., is ε(98° C.), wherein the value of ε(98° C.) is less than −0.45, optionally at most −0.85;

the shrinkage of the thermally shrinkable label film, after a thermal treatment such that the temperature of the thermally shrinkable label film has been T=65° C., is ε(65° C.), wherein the value of ε(65° C.) is greater than −0.10, preferably greater than −0.07; optionally at most 0;

and the thermally shrinkable label film has a relative temperature dependent shrinkage $\varepsilon_r(T)=\{[L(T)-L_0]/L_0\}/\varepsilon(98°$ C.), wherein the difference between the values of the relative temperature dependent shrinkage $\varepsilon_r(T)$ for at least one pair of temperatures $T_2$ and $T_1$ having a difference $T_2-T_1=15°$ C., i.e. $\varepsilon_r(T_2)-\varepsilon_r(T_1)$, is more than 50 percentage points; wherein the lower of the two temperatures of the pair, $T_1$, is from 65° C. to 70° C.

In the previously presented, the lower of the two temperatures $T_1$ may be 65° C. The difference between the values of the relative temperature dependent shrinkage $\varepsilon_r(T)$ for at least the pair of temperatures $T_2=85°$ C. and $T_1=65°$ C., i.e. $\varepsilon_r(T_2)-\varepsilon_r(T_1)$, may be more than 65 percentage points, preferably more than 70 percentage points.

According to another embodiment, a heat shrinkable (thermally shrinkable) label film having a first length $L_0$ in a first direction before heat treatment and a second length in the first direction L(T) after heat treatment wherein the temperature of the thermally shrinkable plastic film has been T, whereby the thermally shrinkable label film has a temperature dependent shrinkage $\varepsilon(T)=[L(T)-L_0]/L_0$, wherein the value of the temperature dependent shrinkage $\varepsilon(T)$ for the temperature T=65° C. is greater than −0.10, and the value of the temperature dependent shrinkage $\varepsilon(T)$ for the temperature T=80° C. is less than −0.25.

According to another embodiment, a heat shrinkable (thermally shrinkable) label film having a first length $L_0$ in a first direction before heat treatment and a second length L(T) in the first direction after heat treatment wherein the temperature of the thermally shrinkable label film has been T, whereby the thermally shrinkable label film has a temperature dependent shrinkage $\varepsilon(T)=[L(T)-L_0]/L_0$, wherein the shrinkage of the thermally shrinkable label film, after a thermal treatment wherein the temperature of the thermally shrinkable label film has been T=98° C., is ε(98° C.), wherein the value of ε(98° C.) is less than −0.45, optionally at most −0.85; and the thermally shrinkable label film has a relative temperature dependent shrinkage $\varepsilon_r(T)=\{[L(T)-L_0]/L_0\}/\varepsilon(98°$ C.), wherein the value of the relative temperature dependent shrinkage $\varepsilon_r(T)$ for the temperature T=65° C. is less than 10% and the value of the temperature dependent shrinkage $\varepsilon_r(T)$ for the temperature T=80° C. is more than 45%.

According to an embodiment, shrinkage of the multilayer films of the invention at temperatures between 80 and 150° C., preferably between 80 and 110° C., more preferably between 80 and 90° C. may be more than 20% in the orientation direction of the film. Preferably, shrinkage may be between 20 and 40%, or between 40 and 60%, or more than 60%, for example at least 70% in the direction of the orientation of the film. Referring to FIG. 4, the orientation direction may be parallel to $S_x$. The shrinkage may be between 20 and 90%, preferably between 25 to 80%, and most preferably between 30 and 75% under normal shrink film and label shrinking temperatures between 80 and 150° C., preferably between 80 and 130° C., more preferably between 80 and 110° C., more preferably between 80 and 90° C. in a steam-tunnel. In other than orientation direction, the films may have shrinkage less than 10%, preferably less than 7%, most preferably less than 5%, for example between 0 and 5% or between 2 and 4%. Referring to FIG. 4, the other than orientation direction may be direction parallel to $S_y$. The shrink performance of the multilayer films is adequate in order to conform the film to the profile of the substrate, which is to be labelled.

A face film according to at least some/all embodiments and a label comprising the face film is able to shrink in the direction of the orientation of the face film between 20 and 75% at a temperature range between 65 and 85° C. Preferably, the face film and a label comprising the face film is able to shrink between 25 and 65% at a temperature range between 65 and 85° C. For example, the face film and a label comprising the face film is able to shrink between 25 and 55%, or preferably between 30 and 40% at a temperature range between 65 and 85° C. According to another example, the face film and a label comprising the face film is able to shrink between 35 and 65%, or preferably between 40 and 60% at a temperature range between 65 and 85° C. At temperature below 65° C. the face film and the label comprising the face film shrinks preferably less than 10%. The specific shrinkage profile of the face film and the label comprising the face film has an effect of on providing more controlled shrinkage behaviour for the film at a specific temperature. For example, specific shrinking curves of some/all embodiments may have an effect on more accurate shrinkage to be achieved even if some variation occurs during thermal treatment (shrinking process).

The composition of the multilayer face film according to embodiments has effect of providing adequate shrinkage level for the label, preferably at least 65% shrinkage at 85° C., which is further advantageous during washing in subsequent recycling process. The heat shrunk label would not have too much residual shrinkage potential left. High shrinkage potential of the label may be harmful when heated liquid (having a temperature around 80° C.) is used during the separation process, which will cause e.g. curling of the label into tight tubes blocking the washing apparatus.

The face film according to at least some/all embodiments may have a shrink force in the orientation direction of the face film during heating at temperatures between 60 and 98° C. is less than 10 N/15 mm, or less than 8 N/15 mm, or 1-10 N/15 mm, or 2-8 N/15 mm. Adequate shrink force is needed for the proper fitting of the label around an item when heat is applied.

The face film according to at least some/all embodiments may have tensile strength in the orientation direction of the film between 90 and 170 MPa. Elongation in orientation direction of the film may be between 20 and 50%. Bending resistance (L&W 5 mm, 15°) may be between 10 and 20 mN. 1% secant modulus may be at least 500 MPa, or between 1200 and 2000 MPa, or between 1200 and 1800 MPa, when measured according to standard ISO 527-3.

The composition of the multilayer structure according to embodiments has effect of providing the overall film density less than 1 g/cm³. Preferably the density is less than 1 g/cm³ also after printing of the film. The density may be, for example between 0.90 and 0.98 g/cm³, or between 0.90 and 0.95 g/cm³.

According to an embodiment, the multilayer plastic film contains less than 20 wt. %, preferably less than 10 wt. % or less than 5 wt. % polymeric material having high density. The polymeric material is preferably the film forming material, i.e. the raw material of the multilayer face film. High density refers to density greater than or equal to 1.3 g/cm³, or greater than or equal to 1.25 g/cm³, or greater than or equal to 1.1 g/cm³. An amount of high density material having density between 1.1 and 1.5 g/cm³, between 1.1 and 1.3 g/cm³, or between 1.1 and 1.25 g/cm³ may be, for example, between 5 and 20 wt. %, preferably between 5 and 10 wt. %, or preferably between 1 and 5 wt. %, and most preferably between 0.5 and 5 wt. %. The densities are typically measured near room temperature, such as 25° C. For example, the multilayer plastic film preferably does not include polymeric raw materials, such as polyvinylchloride or polyethylene terephthalate.

Low density of the film has effect of enabling the film and label comprising said film to be more easily separated from the substrates having higher density, such as PET bottles. Said film density allows the films to be separated from the substrate material during recycling process, for example in the normally used washing process of the bottles, i.e. flotation separation process, of the bottles or other containers. The separated labels may also be further recycled.

The films of the invention are suitable for labels and use for labelling of items. Especially the multilayer plastic films may be used for a face film of a label. In other words, the films described above are suitable for a label film. The films are suitable for labelling of a wide range of product designs and particularly suitable for highly contoured containers and products comprising curved sections, recesses and/or protrusions at the outer surface. The labels comprising heat shrink multilayer face film are suitable for items of glass, plastic, ceramics, glass, and metal. Shrinkage properties of films and/or labels enable labels to be used in highly contoured containers. The item may comprise or consists of polyethylene terephthalate (PET). The item may have a shape of a bottle. The films of the invention may also be used for labelling of batteries. The films may also be used as a face stock of a label laminate further comprising an adhesive layer and a release liner. For example, film according to the some or/all embodiments may be used for a face stock of a wash-off labels. Wash-off labels may be used e.g. for labelling of glass bottles. Due to the shrinking capability of the film, the labels may be efficiently detached and removed (washed-off) from the surface labelled during subsequent washing process.

Figure 5:
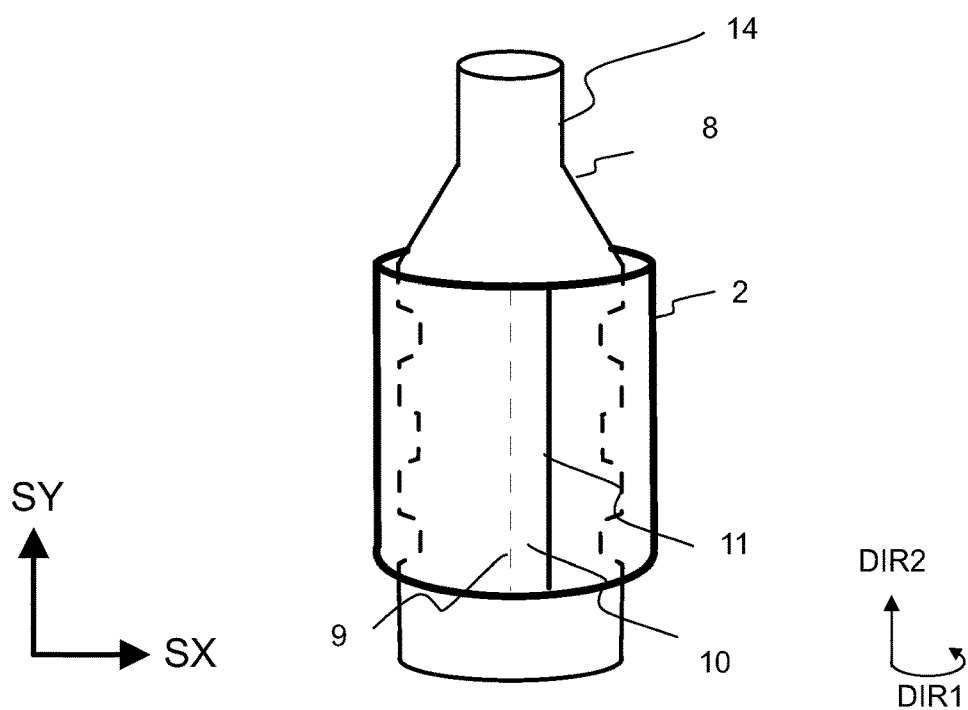
FIG. 5 shows an example embodiment of a label around an item.

Roll-fed shrink labels may be applied to an item with a combination of steps including: rolling over, seaming and shrink technique. Labels may be provided in a roll of continuous label stock and cut into individual labels. Referring to FIG. 5, a label 2 cut from a continuous label stock and comprising or consisting of a multilayer plastic film is mounted around the outer surface of an item 8. Preferably, orientation direction $S_x$ of the label film extends circumferentially around the item 8 in direction DIR1. Thus it is possible to provide 360° C. decoration for the item. Main shrinking direction of the film is indicated by the $S_x$ corresponding to direction DIR1, as shown in FIG. 5. $S_x$ may correspond to the orientation direction of the film, for example machine direction MD.

Figure 6:
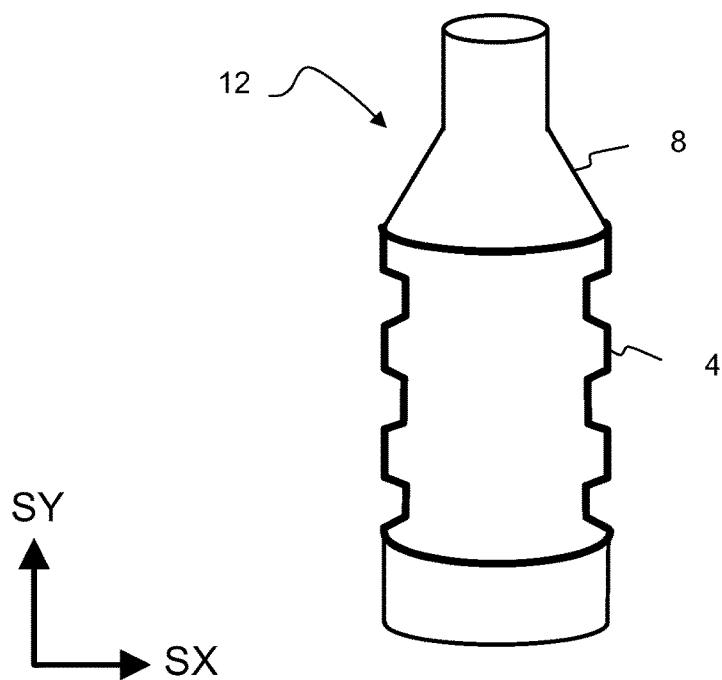
FIG. 6 shows an example embodiment of a label shrunk and fitted on a surface of an item i.e. a labelled item.

Referring to FIG. 5, the opposite edges of the label, leading edge 9 and trailing edge 11, may overlap and form a seam 10. The seam 10 may comprise an adhesive layer, such as a hot melt or UV-curable adhesive. Alternatively, it may comprise solvent dissolving the film materials and thus provide a joint. The adhesive may be provided as a continuous strip or separate adhesive patterns. Alternatively, the seaming may be performed using other methods such as laser welding, heat sealing, or ultrasonic bonding. The item 8 having a label 2 wrapped around it is subsequently heated. The heating causes the label to shrink and to conform to the surface of the item. A shrunk, tight fitting label 4 for the item 8 is shown in FIG. 6. The shrunk label 4 provides a smooth and consistent coating for the item. The heating temperature of the film may be between 80 and 150° C., preferably between 120 and 130° C. in hot-air tunnels or between 80 and 90° C. in steam tunnels. Labels comprising oriented films in this embodiment shrink in the machine direction ($S_x$), The machine direction is extending circumferentially around the item. The heat that induces shrinkage may be provided by conventional heat sources, such as hot steam, heated air, infrared radiation, or any other suitable heat source.

The item to be labelled may be highly contoured container, such as shampoo or detergent bottle, or drink container having e.g. recesses and/or protrusions at the outer surface. Thus, for example, a diameter of the bottle may alternate. A container may comprise different diameters. Difference between the diameters to be labelled in a container may be up to 30%, or up to 20%, or 2-30%, or 5-20%, or 8-15%. According to an example, the difference between the smallest diameter and the largest diameter of the item to be labelled may be up to 30%, or up to 40%, or up to 50%, or up to 60%, or up to 70%, or 2-70%, or 5-60%, or 10-35%. The item may also be recyclable.

Figure 7:
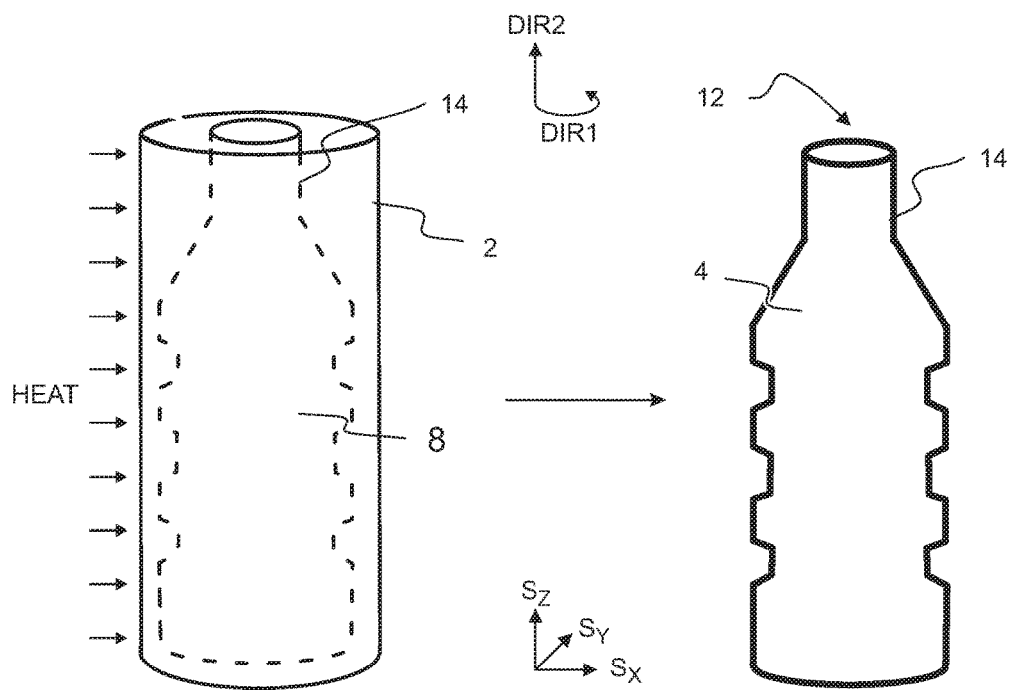
FIG. 7 shows another example embodiment of a label around an item and fitted on a surface of an item i.e. a labelled item.
Figure 8:
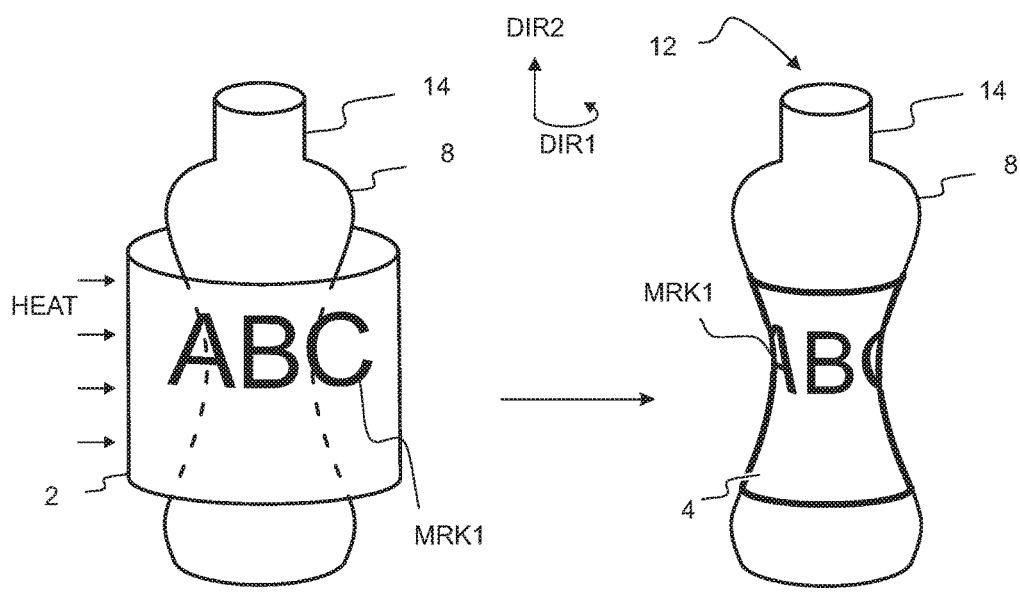
FIG. 8 shows another example embodiment of a label around an item and fitted on a surface of an item i.e. labelled item

The label may be a full body label, i.e. the shrunk label 4 may cover substantially the whole outer surface of the item 8, as shown in FIG. 7. Alternatively, the label may cover the item only partially, as shown in FIG. 6 and FIG. 8. Referring to FIG. 8, for example a neck of a bottle 14 may be left without a label, or a separate and/or different label may be used for the bottle neck part than for the bottle volume part.

According to an embodiment, the label may consists of a face film having transversal orientation direction (TD). Prior to labelling, transverse oriented films may be solvent seamed into a form of a continuous tube. The continuous tube is then cut into shorter, predetermined lengths and supplied as a separate tube around an item. The labelled item is transferred to the following process step of heating so as to provide shrinking of the label around the item.

Multilayer face film structure according to embodiments has effect of providing a heat shrinkable label which can be easily separated in re-cycling process from the item it is mounted. After the item comprising a label has been used, the item is crushed (grinded) into pieces. In particular, when the area in between the label and the surface of the item is free from adhesive, the film may be separated from the item during this crushing. After crushing the pieces of the labelled item may be take into washing step comprising a heated washing liquid. Temperature of the liquid may be around 80° C. In a preferred embodiment, the pieces of the item are separated from the pieces of the label based on the difference in their densities. For example, the label may float on a liquid (washing liquid) having a special density. The item may sunk in the liquid. In an embodiment, the item has a first density D1,
the label has a second density D2, and the ratio of the second density to the first density, D2/D1, at most 0.9; preferably at most 0.8 or at most 0.7 at a temperature, such as at the temperature 80° C.

Thereby, when the liquid has a special density that is more than D2 and less than D1, the pieces of the item 8 sink into the liquid, while the pieces of the label 2 float on the liquid. At 80° C., the density of water is 972 kg/m$^3$. However, the density of the cleaning liquid can be affected by ingredients (e.g. salts) added to the cleaning liquid. Thus, in a preferred embodiment, the second density D2 (of the label) is less than 1000 kg/m$^3$, preferably less than 950 kg/m$^3$ at the temperature 80° C. Moreover, preferably in addition, the first density D1 (of the item) is more than 1000 kg/m$^3$ at the temperature 80° C.

For example, in an item comprising PET (having the density of about 1380 kg/m$^3$), and a label having the density of about 920 kg/m$^3$, the ratio is as low as 0.67.

In an embodiment, the thermally shrinkable face film (and the shrunk film of the item) has a density D2 of less than 1100 kg/m$^3$, preferably less than 1000 kg/m$^3$, such as less than 920 kg/m$^3$. The densities are typically measured near room temperature, such as 25° C., however, increasing temperature up to e.g. 80° C. does not affect the density much.

For the person skilled in the art, it will be clear that modifications and variations of the products and the methods according to the present invention are perceivable. The drawings are schematic. The particular embodiments described above with reference to the accompanying drawings are illustrative only and not meant to limit the scope of the invention, which is defined by the appended claims.

The invention claimed is:

1. A heat shrink label comprising a multilayer face film oriented in one direction, the multilayer face film including a first skin layer comprising first cyclic olefin copolymer and second cyclic olefin copolymer, wherein the first cyclic olefin copolymer is different from the second cyclic olefin copolymer, and wherein a glass transition temperature of the first cyclic olefin copolymer and the second cyclic olefin copolymer is between 50 and 90° C., the multilayer face film further comprising a second skin layer comprising a first cyclic olefin copolymer and a second cyclic olefin copolymer, wherein the first cyclic olefin copolymer and the second cyclic olefin copolymer are the same as the first cyclic olefin copolymer and the second cyclic olefin copolymer of the first skin layer; the multilayer face film further comprising a core layer arranged between the first skin layer and the second skin layer, wherein the core layer comprises terpolymer between 20 and 95 wt. %; and wherein a ratio of the first cyclic olefin copolymer to the second cyclic olefin copolymer in the first skin layer and the second skin layer is between 1.5 and 8.

2. The label according to claim 1, wherein the glass transition temperature of the first cyclic olefin copolymer is different from the glass transition temperature of the second cyclic olefin copolymer, and wherein the difference in the glass transition temperature of the first cyclic olefin copolymer and the second cyclic olefin copolymer is at most 40° C., and wherein the difference in the glass transition temperature of the first cyclic olefin copolymer and the second cyclic olefin copolymer is at least 5° C.

3. The label according to claim 1, wherein the glass transition temperature of the first cyclic olefin copolymer is below 70° C. and the glass transition temperature of the second cyclic olefin is above 70° C.

4. The label according to claim 1, wherein the first skin layer comprises equal amounts of the first cyclic olefin copolymer and the second cyclic olefin copolymer.

5. The label according to claim 1, wherein the first skin layer further comprises linear low density polyethylene at most 20 wt. % of the total weight of the first layer.

6. The label according to claim 1, wherein the terpolymer is at least one of the following terpolymers comprising propylene: 1-butene/propylene/ethylene, propylene/ethylene/1-hexene and propylene/ethylene/1-butene.

7. The label according to claim 1, wherein the terpolymer comprises 1-butene.

8. The label according to claim 1, wherein the terpolymer is 1-butene/propylene/ethylene.

9. The label according to claim 1, wherein the core layer further comprises at least one of the following: polyolefin plastomer and polyolefin elastomer, and wherein an amount of polyolefin plastomer and/or polyolefin elastomer is between 2 and 50 wt. %.

10. The label according to claim 1, wherein the core layer comprises at least one of the following propylene/ethylene plastomer, ethylene/octene elastomer and ethylene/butene elastomer.

11. The label according to claim 1, wherein the multilayer face film has a density between 0.90 and 0.98 g/cm$^3$.

12. The label according to claim 1, wherein the label is configured to shrink in the direction of the orientation of the multilayer face film at least 15% at a temperature between 65 and 85° C. and less than 10% at a temperature below 65° C.

13. The label according to claim 1, wherein the label is configured to shrink in the direction of the orientation of the multilayer face film between 20 and 70% at a temperature between 65 and 85° C. and less than 10% at a temperature below 65° C.

14. The label according to claim 1, wherein the label is configured to shrink between 25 and 65% at the temperature between 65 and 85° C. and less than 10% at a temperature below 65° C.

15. The label according to claim 1, wherein the multilayer face film is oriented in machine direction, and wherein the multilayer face film has a ratio of unstretched film thickness to stretched film thickness between 2 and 10.

16. The label according to claim 14, wherein the multilayer face film is oriented in transverse direction, and wherein the multilayer face film has a ratio of unstretched film thickness to stretched film thickness between 2 and 10.

17. A combination of a heat shrink label and an item, wherein the label comprises a continuous multilayer face film around an external surface of the item, wherein the continuous multilayer face film is oriented in one direction and comprises a first skin layer comprising first cyclic olefin copolymer and second cyclic olefin copolymer, wherein the first cyclic olefin copolymer is different from the second cyclic olefin copolymer, and wherein a glass transition temperature of the first cyclic olefin copolymer and the second cyclic olefin copolymer is between 50 and 90° C., the multilayer face film further comprising a second skin layer comprising a first cyclic olefin copolymer and a second cyclic olefin copolymer, wherein the first cyclic olefin copolymer and the second cyclic olefin copolymer are the same as the first cyclic olefin copolymer and the second cyclic olefin copolymer of the first skin layer: the multilayer face film further comprising a core layer arranged between the first skin layer and the second skin layer, wherein the core layer comprises terpolymer between 20 and 95 wt. %; and wherein a ratio of the first cyclic olefin copolymer to the second cyclic olefin copolymer in the first skin layer is between 1.5 and 8 and wherein a leading edge of the label and a trailing edge of the label are overlapped on the external surface of the item, and wherein at least most of a label surface between the leading edge and the trailing edge is next to the external surface of the item.

18. The combination of a heat shrink label and an item according to claim 17, wherein a difference between the smallest diameter and the largest diameter of the item is between 20 and 80%.

19. The combination of a heat shrink label and an item according to claim 17, wherein the item is a bottle consisting of polyethylene terephthalate.

20. A method for labelling of an item, wherein a label comprises an oriented multilayer face film according to claim 1, the method comprising:
   wrapping the label around the item, wherein the orientation direction of the multilayer face film is extending circumferentially around the item;
   seaming the label by gluing, laser welding, heat sealing, or ultrasonic bonding;
   heating the label at temperature between 65 and 80° C. so as to form a tight fitting label for the item.

21. A method for separating a heat shrink label from an item labelled, the label comprising an oriented multilayer face film according to claim 1, the method comprising:
   crushing said labelled item into pieces,
   exposing the pieces of labelled item to re-cycling process comprising heated liquid having a density more than density of the label and less than density of the item,
   collecting the separated pieces of the item sunk in the washing liquid,
   collecting the separated pieces of the labels floating on the washing liquid.

22. The label according to claim 1, wherein the glass transition temperature of the first cyclic olefin copolymer is different from the glass transition temperature of the second cyclic olefin copolymer, and wherein the difference in the glass transition temperature of the first cyclic olefin copolymer and the second cyclic olefin copolymer is at most 30° C., and wherein the difference in the glass transition temperature of the first cyclic olefin copolymer and the second cyclic olefin copolymer is at least 10° C.

23. The label according to claim 1, wherein the first skin layer further comprises linear low density polyethylene at most 10 wt. % of the total weight of the first layer.

24. The label according to claim 1, wherein the core layer comprises terpolymer between 40 and 90 wt. %.

25. The label according to claim 1, wherein the core layer comprises terpolymer between 50 and 80 wt. %.

26. The label according to claim 1, wherein the core layer further comprises at least one of the following: polyolefin plastomer and polyolefin elastomer, and wherein an amount of polyolefin plastomer and/or polyolefin elastomer is between 5 and 35 wt. %.

27. The label according to claim 1, wherein the core layer further comprises at least one of the following: polyolefin plastomer and polyolefin elastomer, and wherein an amount of polyolefin plastomer and/or polyolefin elastomer is between 10 and 30 wt. %.

28. The label according to claim 1, wherein the label is configured to shrink in the direction of the orientation of the multilayer face film at least 25% at a temperature between 65 and 85° C. and less than 10% at a temperature below 65° C.

29. The label according to claim 1, wherein the label is configured to shrink in the direction of the orientation of the multilayer face film at least 35% at a temperature between 65 and 85° C. and less than 10/o at a temperature below 65° C.

30. The combination of a heat shrink label and an item according to claim 17, wherein a difference between the smallest diameter and the largest diameter of the item is between 30 and 70%.

* * * * *